(No Model.)  2 Sheets—Sheet 1.
B. F. BAILEY & G. H. GRIFFEN.
PORTABLE SODA WATER APPARATUS.
No. 283,060. Patented Aug. 14, 1883.
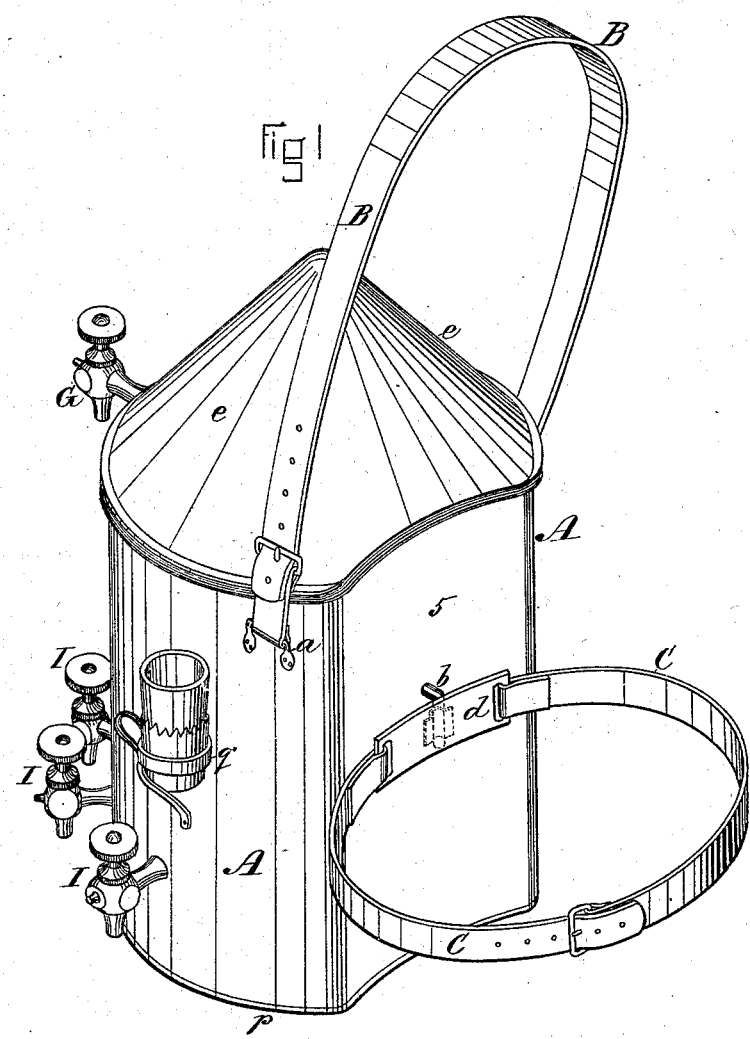
WITNESSES
W. J. Cambridge
E. S. Hanson
INVENTORS
Benj. F. Bailey
Geo. H. Griffen
per T. E. Teschemacher
Atty (No Model.) 2 Sheets—Sheet 2.
B. F. BAILEY & G. H. GRIFFEN.
PORTABLE SODA WATER APPARATUS.
No. 283,060. Patented Aug. 14, 1883.
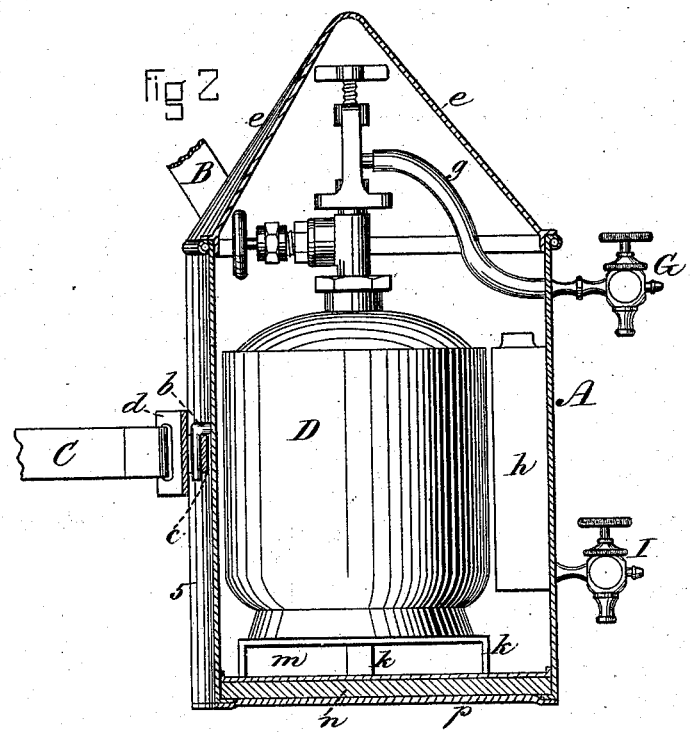
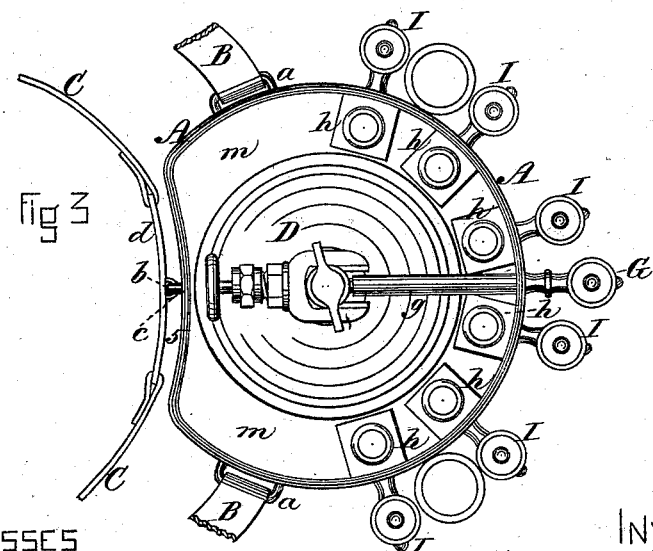
WITNESSES
INVENTORS

UNITED STATES PATENT OFFICE.

BENJAMIN F. BAILEY, OF MANCHESTER, NEW HAMPSHIRE, AND GEORGE H. GRIFFEN, OF WAREHAM, MASSACHUSETTS.

PORTABLE SODA-WATER APPARATUS.

SPECIFICATION forming part of Letters Patent No. 283,030, dated August 14, 1883.

Application filed March 26, 1883. (No model.)

*To all whom it may concern:*

Be it known that we, BENJAMIN F. BAILEY, of Manchester, in the county of Hillsborough and State of New Hampshire, and GEORGE H. GRIFFEN, of Wareham, in the county of Plymouth and State of Massachusetts, citizens of the United States, have invented a Portable Apparatus for Dispensing Soda-Water and other Aerated Beverages in Railway-Trains, of which the following is a full, clear, and exact description, reference being had to the accompanying drawings, making part of this specification, in which—

Figure 1 is a perspective view of a portable soda-water apparatus constructed in accordance with our invention. Fig. 2 is a sectional elevation of the same. Fig. 3 is a plan with the cover removed to show the interior construction.

Our invention has for its object to provide a light and convenient portable apparatus for dispensing soda-water and other aerated beverages, which is especially designed to be suspended by a suitable strap from the shoulders of a person and carried through railway-trains, whereby passengers may be conveniently supplied with soda-water or other aerated beverages without leaving their seats; and our invention consists in a casing of suitable form and size to adapt it for the purpose, and provided with a supporting-strap adapted to pass over the shoulder of the carrier, said casing having arranged within it a small fountain connected with a draft-cock, and, if it be used for dispensing soda-water, a series of sirup cans or chambers connected with sirup-faucets on the outside of the casing, all conveniently arranged to economize space, as hereinafter described.

In the said drawings, A represents a casing, which is preferably composed of tin, but may be made of other suitable material, and is of suitable size to adapt it to be carried in front of a person by means of a stout strap, B, which is attached at its opposite ends to loops *a*, riveted to the casing A upon opposite sides, this strap being adapted to pass over the shoulders of the carrier, which are thus made to sustain the weight of the apparatus, which is preferably steadied and prevented from having any lateral or swinging movement by a hook-shaped pin or pintle, *b*, projecting from the rear side of the casing, and adapted to fit into a socket, *c*, on a plate, *d*, secured to a belt, C, passing around the waist of the carrier. The side 5 of the casing, which lies next to the body of the carrier, is preferably made slightly concave, as seen in Figs. 1 and 3, and the top is surmounted by a removable or hinged cover, *e*, to enable it to be removed or thrown back to expose the interior of the casing, within which is placed a small removable fountain, D, which contains the aerated water or other beverage, and is connected, by a pipe, *g*, and suitable couplings, with an ordinary draft-cock, G, projecting from the front of the casing near the top.

*h* are the sirup cans or chambers, which are also placed within the casing A and secured to the inside of the front wall thereof, or made removable, if desired, these cans occupying the space between the inside of the casing and the fountain D, each can *h* being connected with a sirup-faucet, I, on the outside of the casing, near its bottom.

The fountain D is preferably made to rest upon a support, *k*, whereby its bottom is raised above the bottom of the casing A, leaving a space or chamber, *m*, for the reception of ice, which can also be packed into similar spaces, *m*, between the fountain and the sides of the casing, the ice thus packed within the casing serving also to keep the sirup in the cans *h* in a cool state. In practice it is intended to keep a number of these fountains D duly-charged in a suitable refrigerator located in any convenient and accessible place, so that as soon as one fountain is emptied it can be replaced by a full one, cooled by contact with the ice in the refrigerator, it being merely necessary to remove or swing back the cover *e*, uncouple the pipe *g*, leading to the draft-cock, and then lift out the empty fountain, replace it with a full one, and connect the latter with the draft-cock, when the apparatus will be again ready for use.

We prefer to attach to the bottom of the casing a piece of wood, *n*, for the purpose of strengthening it, this wooden bottom being preferably covered with a piece of rubber, *p*, or other suitable elastic substance, to prevent the bottom of the apparatus from scratching or marring any surface with which it may come into contact.

The portion or side 5 of the casing A, which lies nearest to or fits against the body of the person carrying the apparatus, is preferably covered with a suitable non-conducting material to prevent injury to the carrier from cold.

The weight of the apparatus complete is not intended to exceed twenty-five or thirty pounds, which will enable it to be readily carried by a person of ordinary strength, and it will be seen that, as the entire apparatus is supported from the shoulders by the strap B, both hands of the person carrying it are free to be used in dispensing the beverage.

Suitable racks or supports, $q$, for the tumblers or tumbler-holders are preferably attached to the front of the casing A, on either side of the draft-cock G.

By the employment of the above-described apparatus, soda-water and other aerated beverages can be conveniently dispensed in railway-cars and other conveyances, thus affording an opportunity for passengers to obtain these refreshing beverages in hot and dusty weather without leaving their seats—a desideratum hitherto unattained; and, although our apparatus is especially designed for use in railway-cars, it is evident that it may be used upon the street or elsewhere, if desired, and it is also obvious that it may be used in cold weather for dispensing hot soda or other aerated beverages, if desired.

If it should be desired to use the apparatus for aerated beverages not requiring sirups, the cans $h$, with their faucets I, may be dispensed with, the fountain D being simply charged with the desired beverage, ready for use.

What we claim as our invention, and desire to secure by Letters Patent, is—

1. The combination, with a portable casing, A, adapted to be carried by a person, and provided with a supporting-strap, B, adapted to pass over the shoulders of the carrier, of a fountain, D, arranged within said casing, for containing an aerated beverage, and a draft-cock, G, connected therewith, all constructed and arranged to operate substantially as and for the purpose described, 2. A portable railway soda-water apparatus adapted to be suspended from the shoulders of the carrier, consisting of a casing, A, provided with a strap, B, and having arranged within it a fountain, D, connected with a draft-cock, G, and a series of sirup cans or chambers, $h$, provided with sirup-faucets I, substantially as and for purpose described.

3. The combination, with a portable apparatus for dispensing soda-water and other aerated beverages, adapted to be suspended from the shoulders of the carrier by a strap, B, of the waist-belt C, with its plate $d$, having a socket, $c$, adapted to receive a pin or hook, $b$, projecting from the rear side of the casing A, substantially as and for the purpose set forth.

Witness our hands this 23d day of March, A. D. 1883.

BENJ. F. BAILEY.
GEO. H. GRIFFEN.

In presence of—
P. E. TESCHEMACHER,
W. J. CAMBRIDGE.